(12) United States Patent
Kurokawa et al.

(10) Patent No.: US 6,962,057 B2
(45) Date of Patent: Nov. 8, 2005

(54) GAS TURBINE POWER GENERATION SYSTEM

(75) Inventors: Masatoshi Kurokawa, Wako (JP); Nobuyuki Kobayashi, Wako (JP); Tsutomu Yoshino, Wako (JP)

(73) Assignee: Honda Giken Kogyo Kaisha, Tokyo (JP)

( * ) Notice: Subject to any disclaimer, the term of this patent is extended or adjusted under 35 U.S.C. 154(b) by 124 days.

(21) Appl. No.: 10/645,507

(22) Filed: Aug. 22, 2003

(65) Prior Publication Data

US 2004/0040313 A1 Mar. 4, 2004

(30) Foreign Application Priority Data

Aug. 27, 2002 (JP) .............................. 2002-247484
Aug. 27, 2002 (JP) .............................. 2002-247485

(51) Int. Cl.[7] .............................. F02C 7/20; F16M 1/04
(52) U.S. Cl. .......................... 60/796; 60/802; 248/646
(58) Field of Search .......................... 60/796, 797, 798, 60/802; 248/646, 648

(56) References Cited

U.S. PATENT DOCUMENTS

| | | | |
|---|---|---|---|
| 3,418,485 A | * | 12/1968 | Anderson et. al. .......... 290/1 R |
| 3,791,682 A | * | 2/1974 | Mitchell ........................ 290/2 |
| 4,128,769 A | * | 12/1978 | Bons et al. .................... 290/52 |
| 6,368,374 B1 | * | 4/2002 | Tokar et al. ................... 55/498 |

FOREIGN PATENT DOCUMENTS

JP 2000-220463 8/2000

OTHER PUBLICATIONS

"Teledyne Power System's Next Generation, Ground Power Generation System, Wherever the Base-Whatever the Fuel . . . "Teledyne Power Systems, Dec. 1990.*
"Teledyne Power Systems, Ground Power Generator Cart", Teledyne Power Sytems, May 1989.*
Turbine Technology website: www.microturbine.com Capstone Turbine Corporation. (3 pages); downloaded on Jun. 2, 2003.

* cited by examiner

Primary Examiner—Charles G. Freay
(74) Attorney, Agent, or Firm—Squire, Sanders & Dempsey LLP

(57) ABSTRACT

In a gas turbine power generation system having a gas turbine engine and a generator connected to the engine, maintenance ease is enhanced by forming the housing to have openable maintenance faces at two of its faces. Installation space is reduced and a compact configuration is achieved by providing a partition that divides the interior space of the housing into two regions into an upper bay and a lower bay, mounting the engine in the upper bay and mounting air intake duct in the lower bay at a location directly under the engine. Noise is reduced by using a partition to define two separate spaces (bays) and mounting the engine and the air intake duct in the upper and lower bays. Noise is also reduced by preventing engine rotation noise from escaping to the outside through the air intake duct. Moreover, it achieves a reduction in the amount of dedicated space required by constituting the air intake duct of a duct section having an air inlet at a plane coincident with that of the maintenance opening and a filter-housing section for removably housing an air filter, thereby enabling a common space to be utilized for that required in front of the maintenance opening and the air inlet.

11 Claims, 15 Drawing Sheets

US 6,962,057 B2

GAS TURBINE POWER GENERATION SYSTEM

BACKGROUND OF THE INVENTION

1. Field of the Invention

This invention relates to a gas turbine power generation system, particularly to a gas turbine power generation system that uses a generator power source comprising a single-spool micro gas turbine engine whose compressor and turbine are coaxially aligned.

2. Description of the Related Art

The term "micro gas turbine" or "micro turbine" is commonly used to refer to a gas turbine power generation system whose generator is driven by a single-spool gas turbine engine including a coaxially aligned compressor and turbine. In recent years, the micro gas turbine has attracted attention for its utility as an electric power generation means for multifamily housing units, high-rise apartment buildings, factories, large retail stores, leisure facilities, schools, hospitals and the like.

In this type of gas turbine power generator, the engine is supplied with air through an air intake stage including a filter and duct. Technology relating to such an air intake stage is set out, for example, in Japanese Laid-Open Patent Application No. 2000-220463.

This kind of gas turbine power generator requires regular maintenance, such as periodic replacement of the turbine and air filter. To facilitate this work, US-based Capstone Turbine Corporation (http://www.microturbine.com), for example, offers a gas turbine generator that, as shown in FIG. 18, increases maintenance efficiency by use of a structure that enables the main unit 202 of the generator 200 to be slid frontward (downward in the drawing) and out of the housing 204. (FIG. 18 is a simplified top view of the generator 200.)

Regulations require that a gas turbine generator be installed so as to leave a prescribed amount of open space on the side used to conduct inspection and maintenance and in front of the air inlet. Since the spool-type gas turbine engine is relatively long in the direction of the rotating shaft, however, a side parallel to the rotating shaft should preferably be made openable so as to obtain a large open area for maintenance work.

For structural reasons, on the other hand, the air inlet of the air intake stage is usually formed so as to center on an extension of the axis of the engine rotating shaft. Thus, conventionally, the air inlet and the maintenance access opening have been provided on different faces of the gas turbine generator. This is inconvenient because it requires open spaces to be left on two sides and therefore increases the total dedicated space required for the installation.

A gas turbine engine intakes and exhausts more air/gas per unit time than a reciprocating engine and therefore requires a larger air filter. The work of changing the air filter is therefore more troublesome.

Further, when installing the gas turbine generator referred to above, it is best to reserve (dedicate) at least a total amount of space equal to the size of the housing 204 plus the space 206 occupied by the housing 204 when it is slid fully forward and a space 208 for carrying out maintenance. More efficient space utilization is obviously desirable. Moreover, for maximum maintenance ease it is preferable to also reserve the space 210 so that the main unit 202 can be accessed for maintenance from both sides. This further aggravates the inconvenience of having to dedicate a large space for the installation.

In addition, the gas turbine power generator has a number of noise sources that produce, for instance, air intake noise, exhaust noise, and engine rotation noise. However, low-noise (quiet) operation is preferable, especially when the gas turbine power generator is installed to supply electric power at a residential, school or hospitable facility. While noise can be reduced by using large amounts of sound-absorbing material and by lengthening the duct of the air intake system and installing an interposed silencer, these measures increase the size of the generator and also the amount of installation space.

It should also be noted that gas turbine generators are often installed outdoors, e.g., on a roof, because the temperature of the exhaust gas is higher than that of reciprocating engine-driven generators. For reducing installation space, it is therefore effective to decrease not only height but also footprint. The easiest way to reduce the footprint of a single-spool gas turbine engine would be to install it with the longer axial direction standing upright (with the rotating shaft in the direction of gravity (vertical direction)). As the spool-type gas turbine engine is difficult to install vertically for technical reasons, however, installation is generally horizontal (with the rotating shaft lying horizontal). The resulting long length of generator in the horizontal direction has therefore tended to make the footprint large.

In light of the foregoing, a need has been felt for gas turbine generators of this type that are better in maintenance ease, lower in noise (quieter) and smaller (more compact) in installation (dedicated) space. However, these points conflict with one another, as can be seen, for example, from the fact that installation (dedicated) space increases when priority is given to maintenance ease. Conventional gas turbine generators have failed to respond to all of these needs simultaneously.

SUMMARY OF THE INVENTION

An object of this invention is therefore to overcome the foregoing problems by providing a gas turbine power generation system wherein the layout of the air intake stage inlet and maintenance opening is optimized to reduce dedicated installation space and facilitate air filter replacement.

Another object of this invention is therefore to provide a gas turbine power generation system that simultaneously responds to the need for improved maintenance ease, lower noise and reduced installation (dedicated) space (more compact configuration) while maintaining an optimum balance among these conflicting factors.

For achieving this object, the present invention in one of its aspects provides a gas turbine power generation system comprising: a single-spool gas turbine engine having a turbine and a compressor coaxially connected to the turbine, an air intake duct that supplies intake air to the engine; a generator connected to a rotating shaft of the engine, a housing that houses the engine, the air intake duct and the generator and is formed to be a box-like shape having at least two openable maintenance faces; and a partition that divides interior space of the housing into two regions in vertical direction into an upper bay and a lower bay such that the engine is installed in the upper bay and the air intake duct is installed in the lower bay at a location directly under the engine.

For achieving this object, the present invention in one of its aspects provides a gas turbine power generation system, comprising: a single-spool gas turbine engine having a turbine and a compressor coaxially connected to the turbine, an air intake duct that supplies intake air to the engine; a generator connected to a rotating shaft of the engine, and a housing that houses the engine, the air intake duct and the generator and has an openable maintenance face; wherein the air intake duct includes: a duct section that has an air inlet at a plane coincident with that of the openable maintenance face; and a filter-housing section that detachably houses an air filter for cleaning the intake air.

As termed in this specification, "installation space" means the amount of room needed to accommodate the physical dimensions of the gas turbine power generation system, particularly the amount in the horizontal (area) direction, i.e., the footprint. The term "dedicated space" means the total amount of room needed for practical operation of the gas turbine power generation system, i.e., the installation space plus the space needed for conducting maintenance and the space that has to be left open in front of the air inlets and exhaust outlets.

BRIEF DESCRIPTION OF THE DRAWINGS

The above and other objects and advantages of the invention will be more apparent from the following description and drawings, in which.

DETAILED DESCRIPTION OF THE PREFERRED EMBODIMENT

A gas turbine power generation system according to an embodiment of the present invention will now be explained with reference to the attached drawings.

Figure 1:
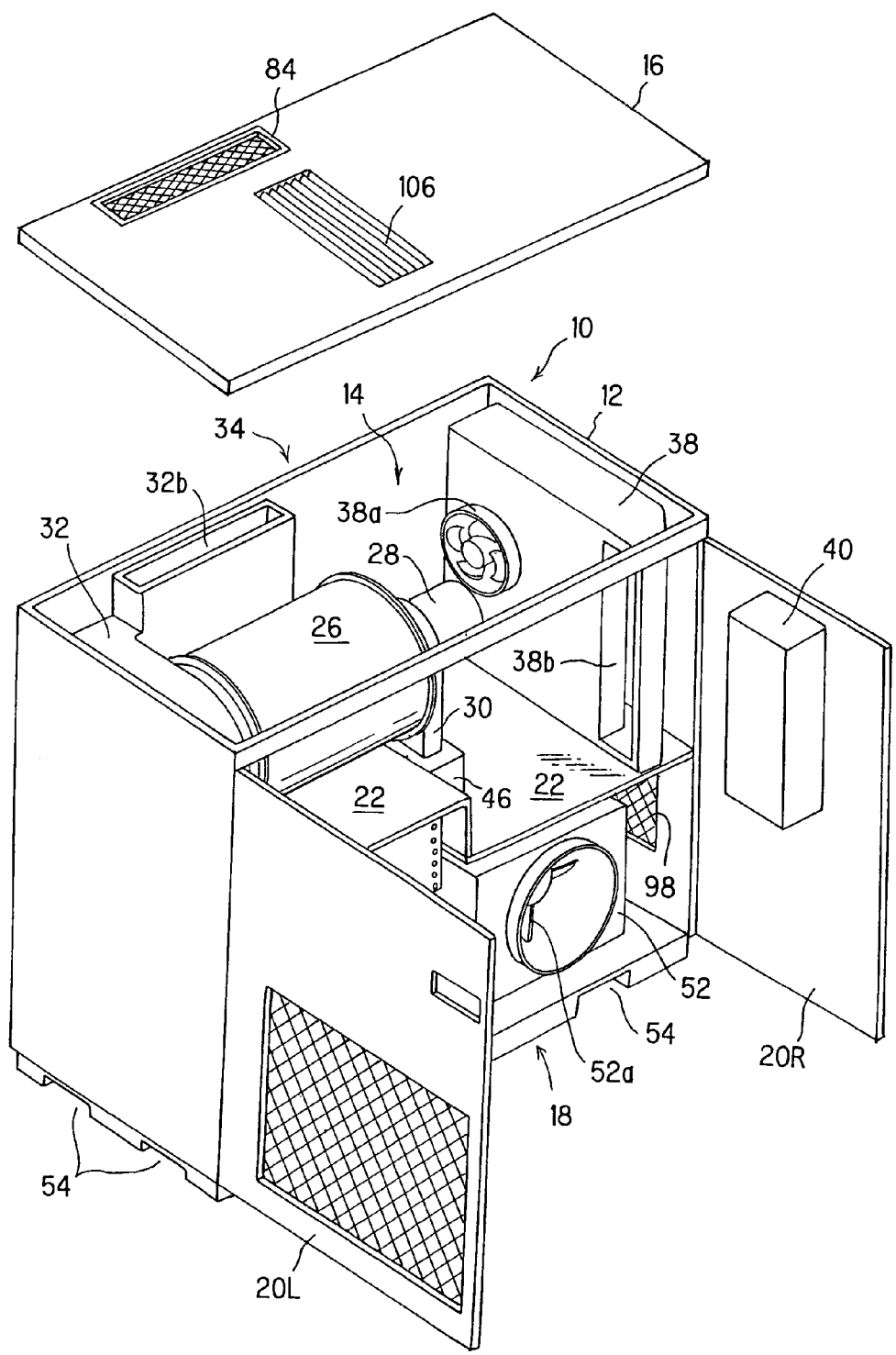
FIG. 1 is a perspective view showing a gas turbine power generation system, as a whole, according to the present invention.

FIG. 1 is a perspective view showing the gas turbine power generation system as a whole.

In FIG. 1, the gas turbine power generation system (hereinafter sometimes referred to simply as "generator system") is denoted by reference numeral 10. The generator system 10 is equipped with a substantially box-like housing 12. The top of the housing 12 is formed as an openable and closable upper face for use in maintenance (hereinafter called "first openable maintenance face 14"). The first openable maintenance face (opening) 14 can be opened/closed by removing/attaching a roof (cover) 16.

Another of the faces of the housing 12 is also formed to be openable for maintenance and is designated a second openable maintenance face (opening) 18. The face formed with the second openable maintenance face 18 is at the front of the generator system 10. The second openable maintenance face 18 can be opened and closed by a left door 20L and right door 20R.

Figure 2:
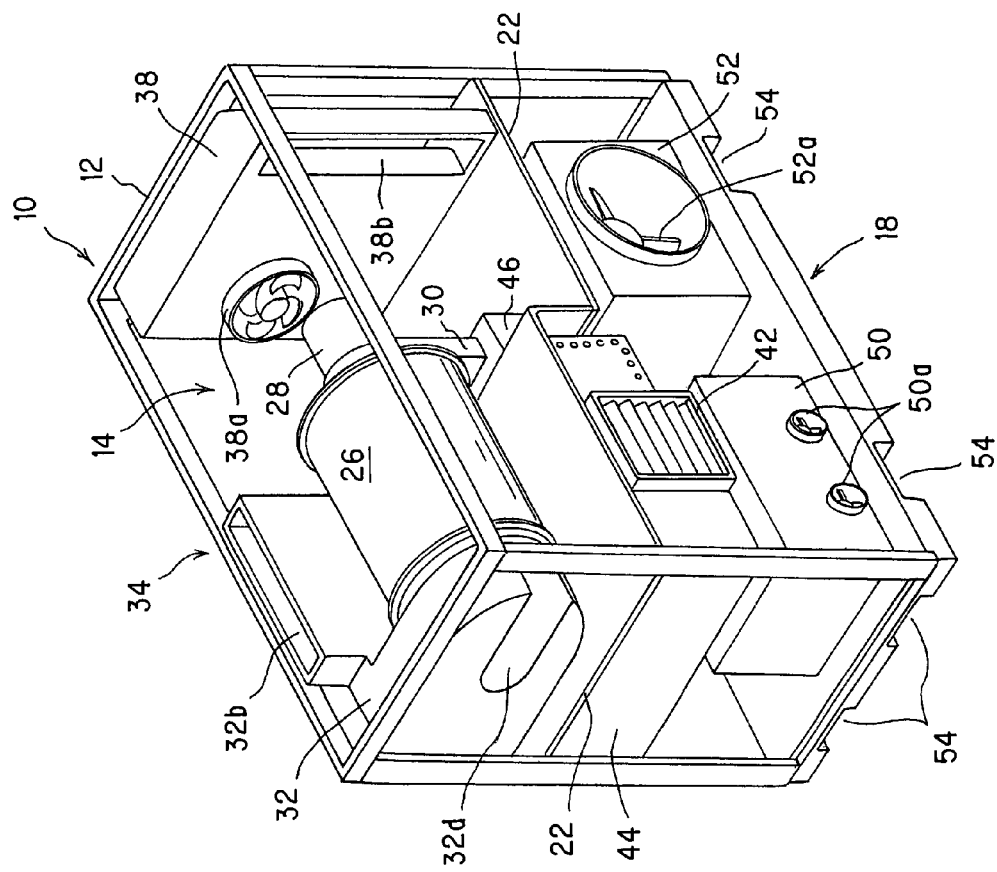
FIG. 2 is a perspective view showing the system illustrated in FIG. 1, with its housing wall panels removed.
Figure 3:
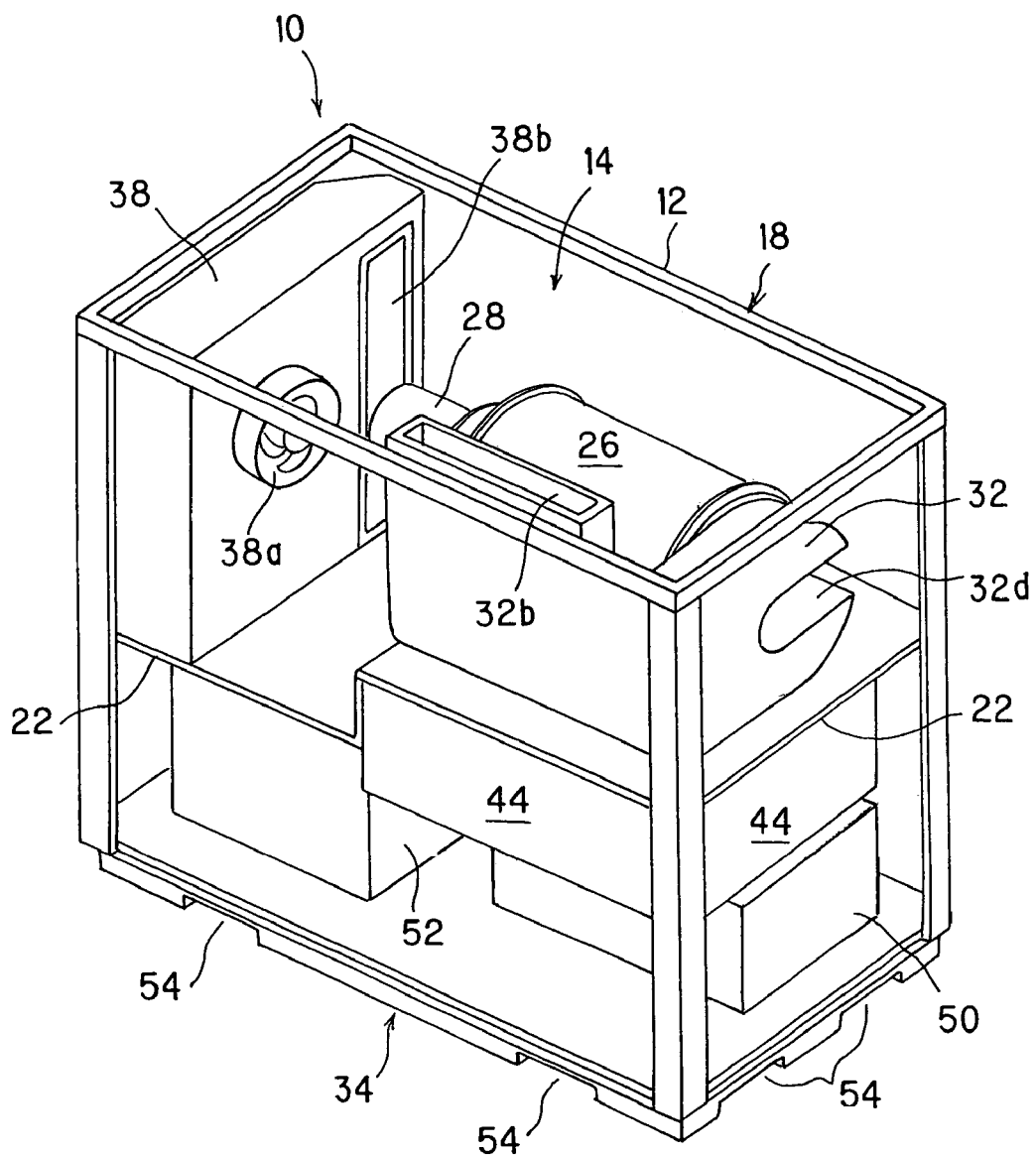
FIG. 3 is a perspective view showing the system illustrated in FIG. 1, with its housing wall panels removed, taken in a downwardly slanting direction from the rear.

FIG. 2 is a perspective view showing the housing 12 with its wall panels (including the roof 16 and the doors 20R and 20L) removed. FIG. 3 is a perspective view of the generator system 10 of FIG. 2 taken in a downwardly slanting direction from the rear (side opposite the front).

The structure of the generator system 10 will now be explained with reference to FIGS. 1 to 3. The housing 12 is equipped with a partition 22 that divides its interior space into two regions in the vertical direction. The one above will be called the "upper bay" and the one below the "lower bay." The upper bay and lower bay are airtightly enclosed by the partition 22 and unshown wall panels. A cylindrical gas turbine engine (hereinafter called simply "engine") 26 is mounted or installed horizontally (with the rotating shaft (not shown in the figures) lying horizontal). The engine 26 is connected to a generator 28 that is driven by the rotational output of the engine 26. An engine side air intake passage 30 is provided between the engine 26 and the generator 28 for introducing intake air to the engine 26. The air intake passage 30 is airtightly connected to the engine 26 via an appropriate seal member (not shown).

An exhaust duct 32 mounted at the end of the engine 26 opposite from that connected to the generator 28 is airtightly connected to an exhaust outlet of the engine 26 via an appropriate seal member (not shown) to exhaust combustion gas generated by the engine to the exterior of the housing 12. More specifically, the exhaust duct 32 is mounted near the face (designated by reference numeral 34 in FIG. 1) on the far side of the engine as viewed from the second openable maintenance face (front).

A ventilation assembly for ventilating and cooling the upper bay is provided in the upper bay. The ventilation assembly comprises an upper bay ventilation air intake duct 38 and an upper bay ventilation air exhaust duct (explained later). The upper bay air intake duct 38 is equipped with an upper bay ventilation air fan 38a for sucking in air from outside the generator system 10 and at a location near the second openable maintenance face 18 with an opening 38b. The opening 38b is airtightly connected via an appropriate seal member (not shown) to an upper bay air intake duct section 40 (shown in FIG. 1) formed in the right door 20R for opening and closing the second openable maintenance face 18.

An air intake duct 42 for introducing intake air to the engine 26 is mounted or installed directly under the engine 26 in the lower bay of the housing 12. The air intake duct 42 is airtightly housed in an air intake duct mount 44 formed in the lower bay. The air intake duct mount 44 is formed at a location adjacent to the partition 22 as a compartmented space of substantially the same shape as the air intake duct 42 that is airtightly isolated from the lower bay.

A mount side air intake passage 46 that passes through the partition 22 is formed integrally with the air intake duct mount 44. The mount side air intake passage 46 is airtightly connected to the engine side air intake passage 30 via an appropriate seal member. Intake air flowing in from the air inlet 42 of the air intake duct 42 passes through an air filter (not shown) in the air intake duct 42 to be supplied to the engine 26 through the mount side air intake passage 46 formed in the air intake duct mount 44 and the engine side air intake passage 30 connected to the mount side air intake passage 46.

An electrical unit 50 is mounted under the air intake duct 42 in the lower bay. The electrical unit 50 is mounted on guide rails (not shown) so that it can be pulled out through the second openable maintenance face 18. The electrical unit 50, which is electrically connected to the upper bay air intake duct 38 via wiring (not shown), converts the electric power generated by the generator 28 to ac current of the desired frequency and supplies it to external electrical equipment (not shown).

The electrical unit 50 is equipped with self-cooling fans (hereinafter called "electrical unit fans") 50a that cools the electric unit 50 by external air. The electric unit controls operation (speed) of the fans 50a based on its own temperature so as to prevent excessive temperature rise. The electrical unit 50 additionally controls the operation of a number of cooling fans explained later in accordance with different sections of the housing 12. It also controls the speed of the engine 26 in response to the power demand of the external electrical equipment.

A fuel compressor (fuel supplier) 52 is mounted or installed in the lower bay at a location diagonally opposite from the engine 26 mounted in the upper bay. The fuel compressor 52 is mounted on guide rails (not shown) so that it can be pulled out through the second openable maintenance face 18. It compresses a gaseous fuel, such as natural gas or city gas, and supplies it to the engine 26 through a fuel supply line (not shown). The fuel compressor 52 is equipped with a self-cooling fan (hereinafter called "compressor fan") 52a whose speed is controlled by the electrical unit 50.

The effect obtained by configuring (arranging) the different constituents of the generator system 10 in the foregoing manner will now be explained.

Figure 4:
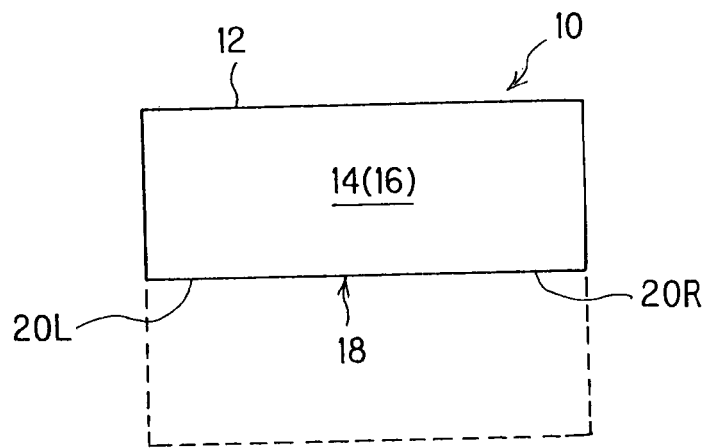
FIG. 4 is an explanatory view showing a horizontal maintenance work space required for the system illustrated in FIG. 1.

Maintenance work is facilitated and maintenance ease enhanced by forming the housing 12 in a substantially box-like shape and providing it with two openable maintenance faces, namely, the first openable maintenance face 14 and the second openable maintenance face 18. Moreover, since the first openable maintenance face 14 is formed at the top face, the only work space in the horizontal direction required in order to meet legal requirements is, as shown in FIG. 4, that in front of the side formed with the second openable maintenance face 18. The dedicated space is therefore reduced.

Engine rotation noise is prevented from escaping to the outside through the air intake duct 42 because the engine 26 mounted in the upper bay and the air intake duct 42 mounted in the lower bay are separated by the partition 22. In addition, the footprint of the generator system 10 is made smaller because the engine 26 and air intake duct 42, which take up a relatively large amount of space in the generator system 10, are stacked vertically with the partition 22 in between. The installation space is therefore reduced. Moreover, conduction of heat from the engine 26 to the air intake duct 42 is mitigated because the partition 22 is present between the engine 26, which reaches a high temperature, and the air intake duct 42. Prevention of intake air temperature increase is therefore enjoyed as a side benefit.

By "installation space" is meant the amount of room needed to accommodate the physical dimensions of the gas turbine power generation system, particularly the amount in the horizontal (area) direction, i.e., the footprint. By "dedicated space" is meant the total amount of room needed for practical operation of the gas turbine power generation system, i.e., the installation space plus the space needed for conducting maintenance and the space that has to be left open in front of the air inlet and exhaust outlet. From this it follows that reducing installation space reduces dedicated space.

Maintenance work can be conducted through the second openable maintenance face 18 without interference from the relatively large-volume exhaust duct 32 because the exhaust duct 32 is mounted near the face (rear face) 34 on the far side of the engine as viewed from the second openable maintenance face 18 (front). Therefore, maintenance work is facilitated and maintenance ease enhanced.

Conduction of heat to the fuel compressor 52 is mitigated because the fuel compressor 52 and compressor fan 52a are mounted on the other side of the partition 22 from the engine 26, which is the hottest member. Since the load of the compressor fan 52a is therefore lowered, the speed of the compressor fan 52a becomes lower to reduce the noise of the generator system 10.

Conduction of heat from the engine 26 to the electrical unit 50 is mitigated because the air intake duct 42 is present between the electrical unit 50 and engine 26. Since the load of the electrical unit fans 50a is therefore lowered, the speed of the compressor fan 52a becomes lower to enhance low-noise operation of the generator system 10.

The center of gravity of the generator system 10 assumes a low position because the relatively heavy electrical unit 50 and electrical unit fans 50a are mounted below the hollow and therefore relatively light air intake duct 42. Moreover, the center of gravity comes to be located toward the middle because the relatively heavy fuel compressor 52 and compressor fan 52a are mounted in the lower bay at locations diagonally opposite the engine 26. As a result, the generator system 10 is easy to move because its stability is good when lifted.

As shown in FIGS. 1 to 3, the bottom face of the housing 12 is formed in different directions with insertion grooves 54 for receiving the forks or blades of a forklift (not shown), specifically with a total of four pairs of insertions grooves 54 located one pair per side of the box-like housing 12. When the generator system 10 is to be moved, therefore, it can be lifted from any direction and can therefore be easily moved irrespective of the shape of the installation site. This further improves maintenance ease.

As explained in the foregoing, the generator system 10 according to this embodiment simultaneously responds to the conflicting requirements for improved maintenance ease, noise reduction and installation (dedicated) space reduction while maintaining an optimum balance among these conflicting factors.

The aforesaid constituents will now be explained in detail.

Figure 5:
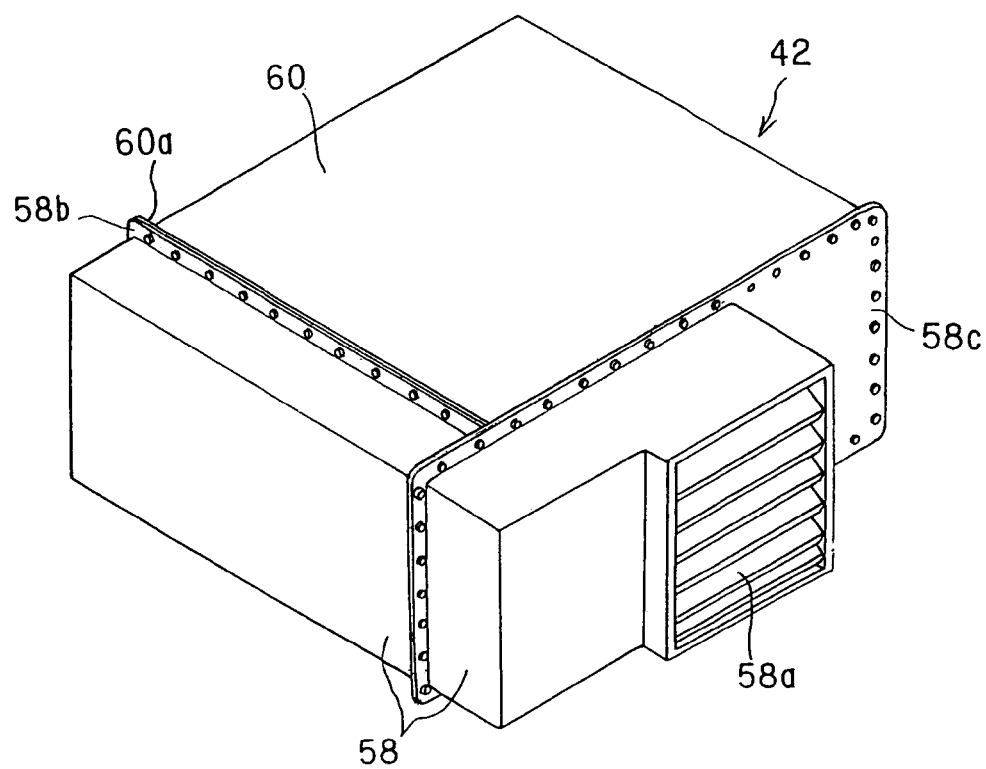
FIG. 5 is an enlarged perspective view of an air intake duct of the system illustrated in FIG. 1.
Figure 6:
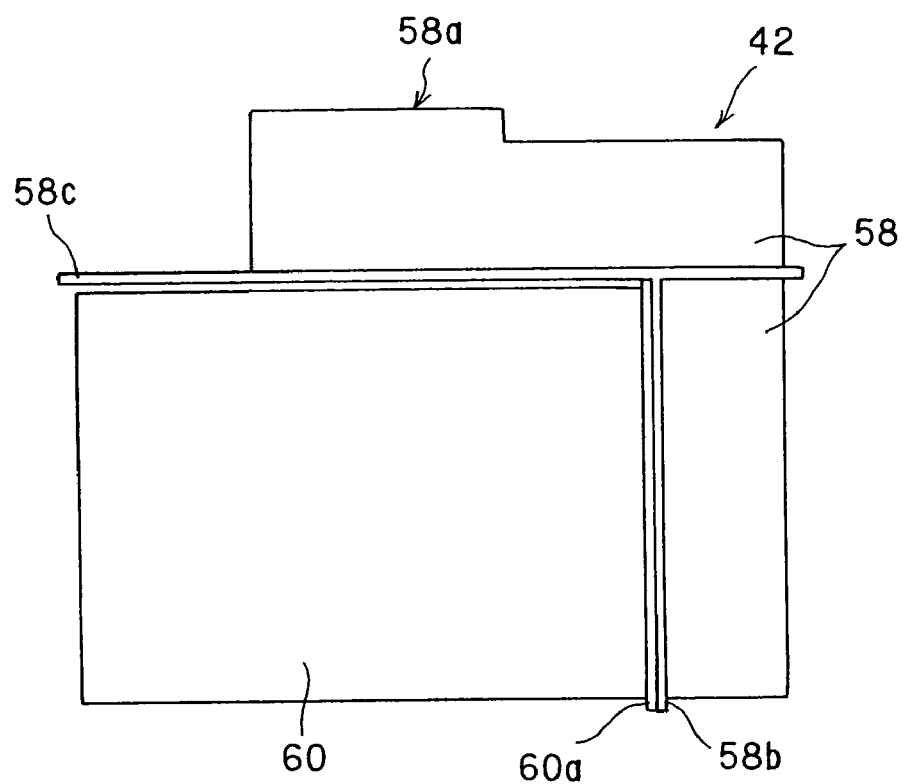
FIG. 6 is a top view of the air intake duct illustrated in FIG. 5.

FIG. 5 is an enlarged perspective view of the air intake duct 42 and FIG. 6 is a top view thereof. As shown in these drawings, the air intake duct 42 is split into a duct section 58 and a filter-housing section 60. The filter-housing section 60 is substantially rectangular in top view and houses a removable or detachable air filter (not shown). The duct section 58 is equipped with an air inlet 58a at a plane coincident with that of the second openable maintenance face 18 and is formed to have an L-like shape following the periphery of the filter-housing section 60. The duct section 58 and filter-housing section 60 are formed with connector flanges 58a and 58b, respectively, that are airtightly joined by bolts with an appropriate seal member interposed therebetween.

Thus, the second openable maintenance face 18 and air inlet 58a can share a required space to the front because the air inlet 58a of the air intake duct 42 (the duct section 58) and the second openable maintenance face 18 are formed in the same plane. The dedicated space can therefore be reduced. The amount of space legally required to be left open in front of the second openable maintenance face 18 is larger than that required in front of the air inlet 58a. By the foregoing configuration, therefore, the space required in front of the air inlet 58a comes to be included in the space in front of the second openable maintenance face 18.

The work of changing air filters is easy to conduct because the air intake duct 42 is given a split structure to separately establish the duct section 58 having the air inlet 58a and the filter-housing section 60 for removably accommodating an air filter for cleaning the intake air.

The ease of filter replacement is further enhanced because the duct section 58 and the filter-housing section 60 are airtightly joined so that the air intake duct 42 can be taken out via the second openable maintenance face 18 as a single unit. The dedicated space of the generator system 10 is reduced because no special space is required solely for air filter replacement.

Figure 7:
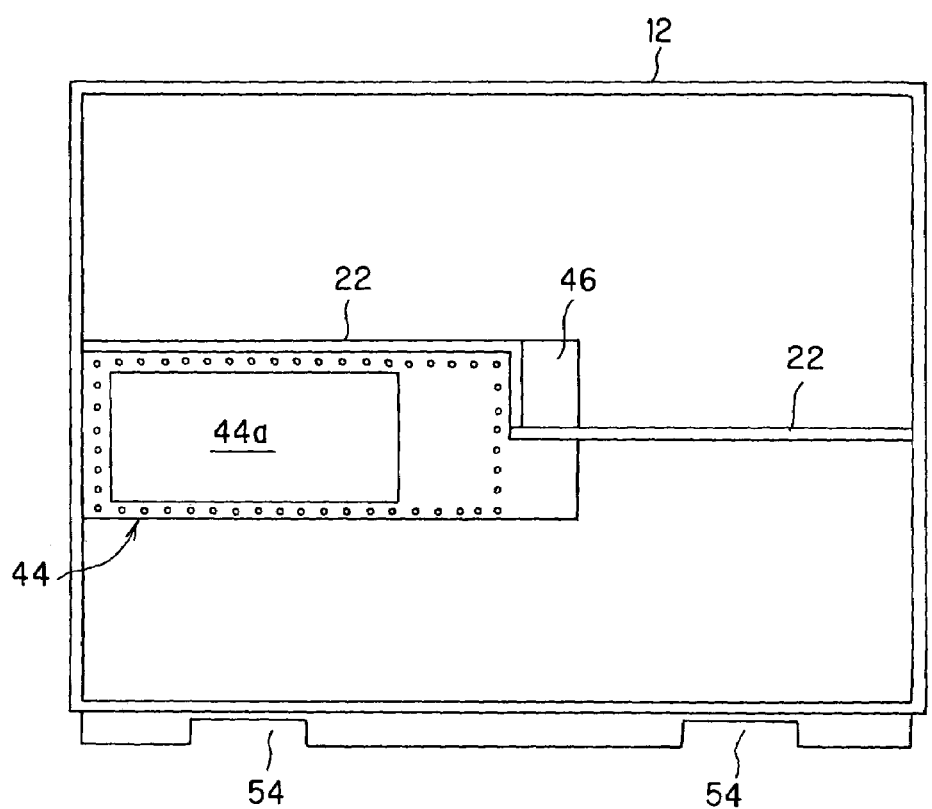
FIG. 7 is a front view of the housing of the system illustrated in FIG. 1, with special attention to an air intake duct mount.

The air intake duct mount 44 that houses the air intake duct 42 will now be explained. FIG. 7 is a front view of the housing 12 shown with special attention to the air intake duct mount 44.

As shown in FIG. 7, the air intake duct mount 44 for mounting the air intake duct 42 is formed in the lower bay at a location adjacent to the partition 22. The air intake duct mount 44 has the same substantially rectangular shape as the air intake duct 42 and is compartmented to be airtightly isolated from the interior space of the housing 12. The mount side air intake passage 46 is formed integrally with the air intake duct mount 44 and extends through the partition 22 into the upper bay.

The air intake duct mount 44 has an opening 44a in the lower bay. The air intake duct 42 is inserted through the opening 44a. The air intake duct 42 (i.e., duct section 58) is equipped with a fastening flange 58c as shown in FIGS. 5 and 6. The air intake duct 42 is airtightly housed in the region defined by the air intake duct mount 44 by bolting the fastening flange 58c to the peripheral region of the opening 44a with an appropriate seal member interposed therebetween.

Figure 8:
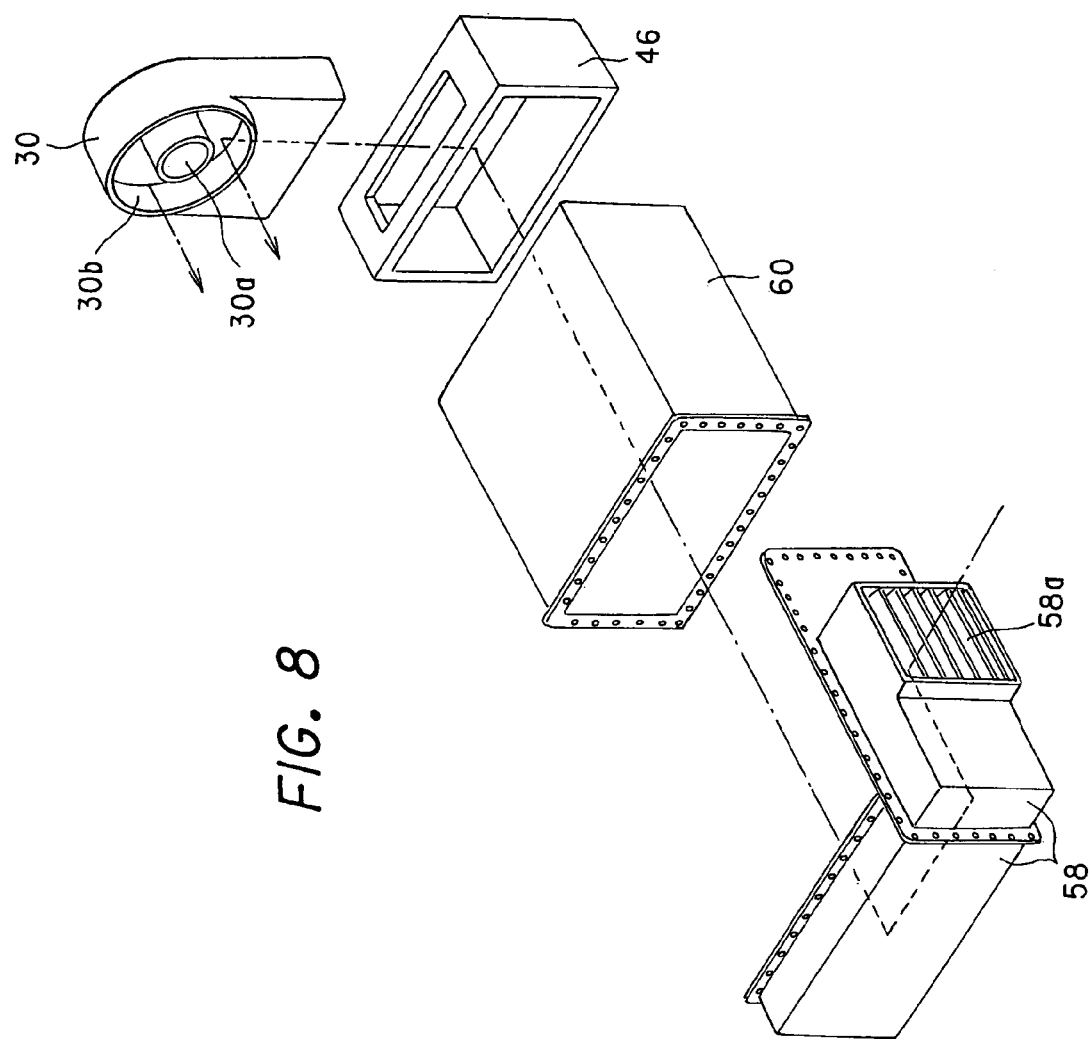
FIG. 8 is an exploded view of the air intake duct illustrated in FIGS. 5 and 6, showing the flow of intake air therein.

FIG. 8 is an exploded view of the air intake duct 42 showing the flow of intake air therein. The arrows in the drawing indicate intake air flow.

As illustrated, air flowing in through the air inlet 58a of the air intake duct 42 (the duct section 58) makes three flow direction changes of 90 degrees in the duct section 58 and then flows into the filter-housing section 60. The intake air flowing into the filter-housing section 60 is removed of dust by the air filter (not shown) housed in the filter-housing section 60 and then flows into the mount side air intake passage 46 formed integrally with the air intake duct mount 44 (not shown). The intake air flowing into the mount side air intake passage 46 changes its flow direction therein by 90 degrees, from horizontal to vertical, and then flows into the engine side air intake passage 30 airtightly connected to the mount side air intake passage 46 with an appropriate seal member (not shown) interposed therebetween.

The intake air flowing into the engine side air intake passage 30 changes the direction of its flow from vertical back to horizontal and is supplied to the engine 26 (not shown in FIG. 8). The engine side air intake passage 30 is formed with a cylindrical tube 30a surrounded by an annular opening 30b. The intake flows through the opening 30b to be supplied to an air inlet (explained later) of the engine 26. The opening 30b is airtightly connected to the air inlet of the engine 26 via an appropriate seal member (not shown). The tube 30a is a hole for passing the rotating shaft (not shown) of the engine 26.

The air intake duct mount 44 thus airtightly divides the region where the air intake duct 42 is mounted from the region where the engine 26 is mounted and supplies air passing through the filter of the air intake duct 42 to the engine 26 through the mount side air intake passage 46 formed integrally with the air intake duct mount 44. This makes the air intake duct 42 easy to mount and dismount and further facilitates the work of replacing the air filter.

Moreover, the configuration of the duct section 58 in a so-called bent structure that changes the flow direction of the sucked-in air at least once (preferably three times) between the air inlet 58a and the point where it flows into the filter-housing section 60 lowers the intake noise of the air intake duct 42 and thus reduces the noise of the generator system 10.

In addition, the configuration of the mount side air intake passage 46 in a bent structure that changes the flow direction of the sucked-in air therein at least once also reduces the intake noise so that still further reduction of the noise of the generator system 10 is achieved.

Figure 9:
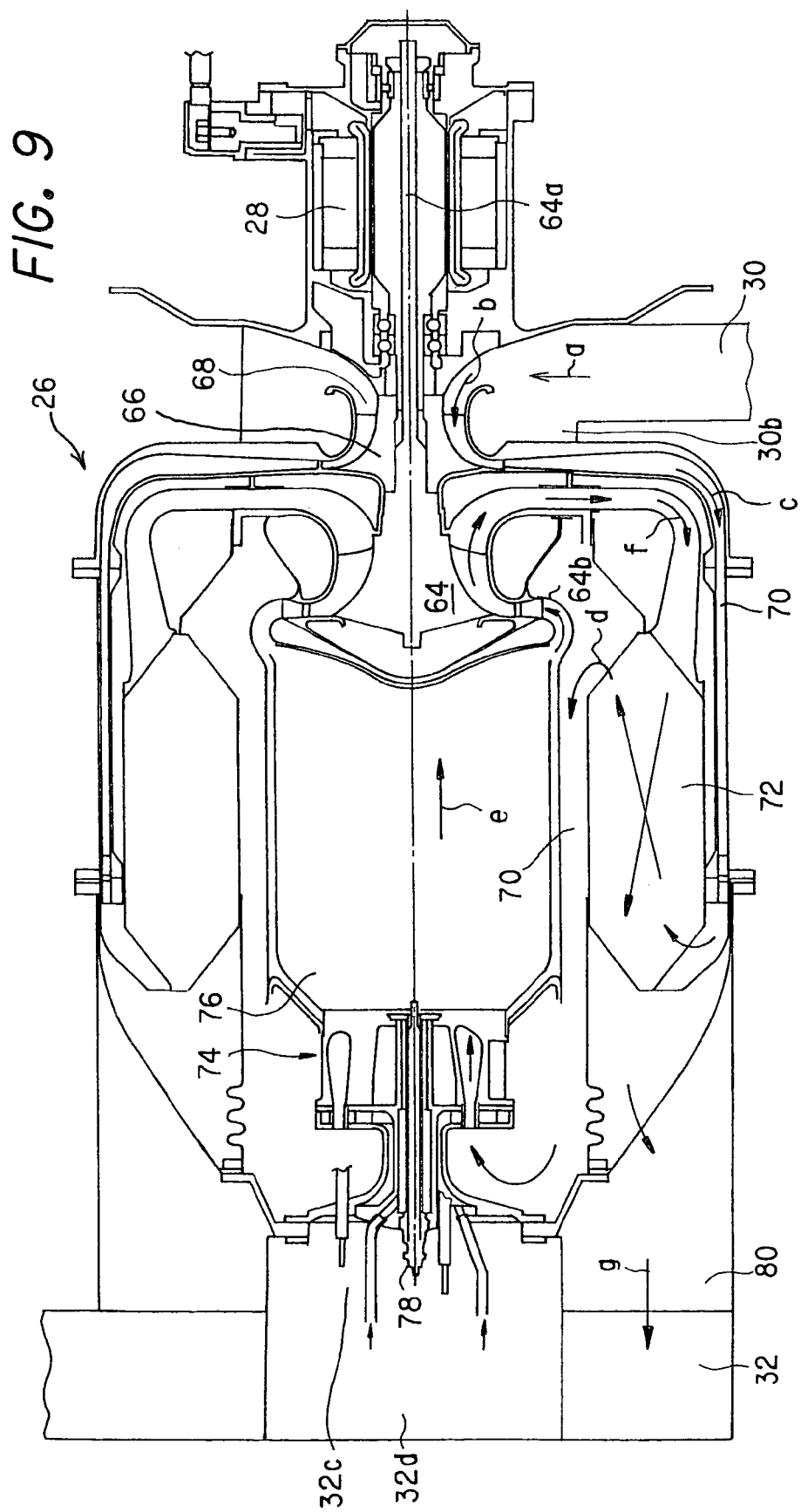
FIG. 9 is an enlarged sectional view of the engine of the system illustrated in FIG. 1.

The engine 26 will be explained next. FIG. 9 is an enlarged sectional view of the engine 26. As illustrated, the engine 26 is equipped with a turbine 64. The rotating shaft 64a of the turbine 64 is connected to a compressor 66. Beyond the compressor 66 the rotating shaft 64a is connected to the generator 28. The generator 28 is driven by the rotation of the turbine 64 to generate between, say, 20 and 100 kW of electric power.

The intake air passing through the engine side air intake passage 30 (fresh air, indicated by arrow a) is sucked into the compressor 66 from an air inlet 68 of the engine 26 as indicated by arrow b and after being compressed flows into an air supply path 70 as indicated by arrow c. A heat exchanger 72 is provided in the course of the air supply path 70 where heat is exchanged between the combustion gas (explained later) and the intake air.

The intake air raised in temperature at the heat exchanger 72 flows into the air supply path 70 as indicated by arrow d and is supplied to venturi mixers 74. The intake air supplied to the venturi mixers 74 flows in the manner indicated by the arrow shown in one of the mixers to be mixed with the gaseous fuel supplied from the aforesaid fuel compressor 52. The resulting air-fuel mixture is jetted into a combustion chamber 76 where it is ignited by an ignition plug 78 to give rise to diffusion combustion or premixed combustion.

The resulting combustion gas flows as indicated by arrow e to pass through a turbine nozzle 64b and rotate the turbine 64. The rotation of the turbine 64 is transmitted through the rotating shaft 64a to rotate the compressor 66 and also drive the generator 28. The combustion gas used to rotate the turbine 64 is sent to the heat exchanger 72, as indicated by arrow f, where heat is exchanged between it and the intake air as mentioned earlier. The heat-exchanged combustion gas is discharged through an exhaust outlet 80 and the exhaust duct 32 as indicated by arrow g.

As illustrated, the engine 26 is a relatively small single-spool micro gas turbine engine whose turbine 64 and compressor 66 are mounted coaxially. Since the spool-type gas turbine engine is long in the rotating shaft direction, the second openable maintenance face 18 is formed at a side face parallel to the rotating shaft 64a, i.e., at a side in the longer direction. Owing to this configuration, there is obtained a large maintenance opening that further enhances maintenance ease.

Figure 10:
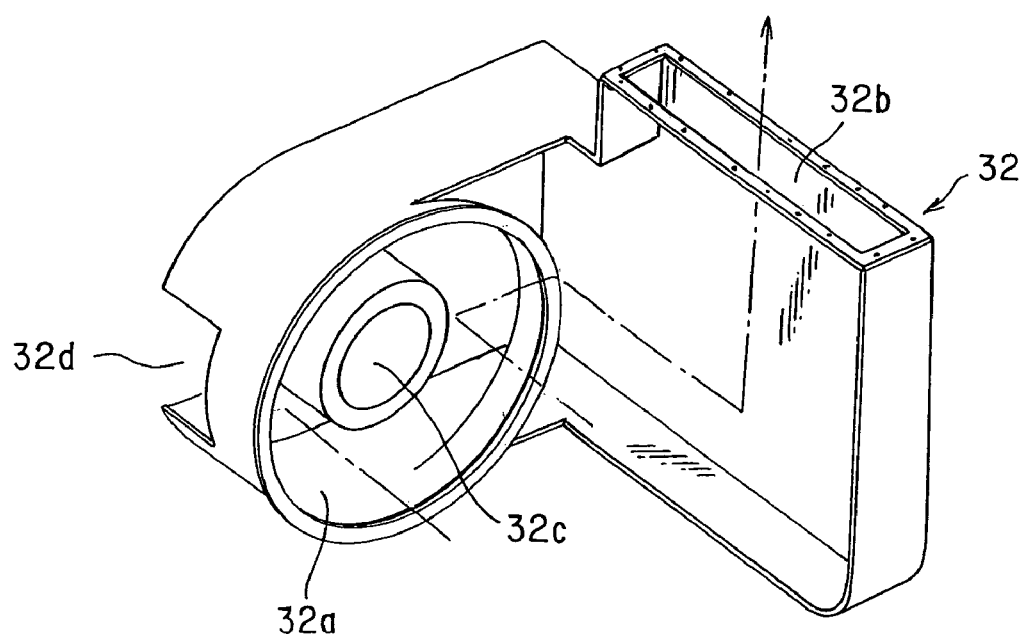
FIG. 10 is an enlarged partial perspective view of an exhaust duct of the system illustrated in FIG. 1, taken in a downwardly slanting direction.

The exhaust duct 32 will now be explained. FIG. 10 is an enlarged partial perspective view of the exhaust duct 32 taken in a downwardly slanting direction.

The exhaust duct 32 is equipped with an air inlet 32a airtightly connected to the exhaust outlet 80 of the engine 26 (neither shown in FIG. 10) via an appropriate seal member. The combustion gas flowing into the exhaust duct 32 through the air inlet 32a is twice changed 90 degrees in flow direction to be discharged to the outside of the exhaust duct 32 through an exhaust outlet 32b. The combustion gas exhausted from the exhaust duct 32 is discharged from the generator system 10 through a combustion gas exhaust outlet 84 provided in the roof 16 (see FIG. 1).

The exhaust duct 32 is thus given a bent structure that changes the flow direction of the combustion gas therein at least once (twice in this embodiment) so that exhaust noise is lowered to reduce the noise of the generator system 10.

A gas turbine engine exhausts more combustion gas per unit time than a reciprocating engine and the exhaust duct for discharging the combustion gas is therefore required to have a relatively large volume. In this embodiment, however, the exhaust duct 32 is, as explained earlier, mounted near the face (rear face) 34 on the far side of the engine as viewed from the second openable maintenance face 18 (front). Maintenance ease is therefore further enhanced because maintenance work can be conducted through the second openable maintenance face 18 without interference from the exhaust duct 32.

A tube 32c formed at the inner periphery of the air inlet 32a is communicated with the second openable maintenance face 18 side through a cutaway portion 32d. As shown in FIG. 9, the ignition plug 78 of the engine 26 is located in the tube 32c. This means that the ignition plug 78 can be accessed through the second openable maintenance face 18, the cutaway portion 32d and the tube 32c. Maintenance ease is therefore further improved because the ignition plug 78 can be replaced through the second openable maintenance face 18 without need to remove the exhaust duct 32.

The airflow (ventilation and cooling) within the housing 12 will now be explained.

Figure 11:
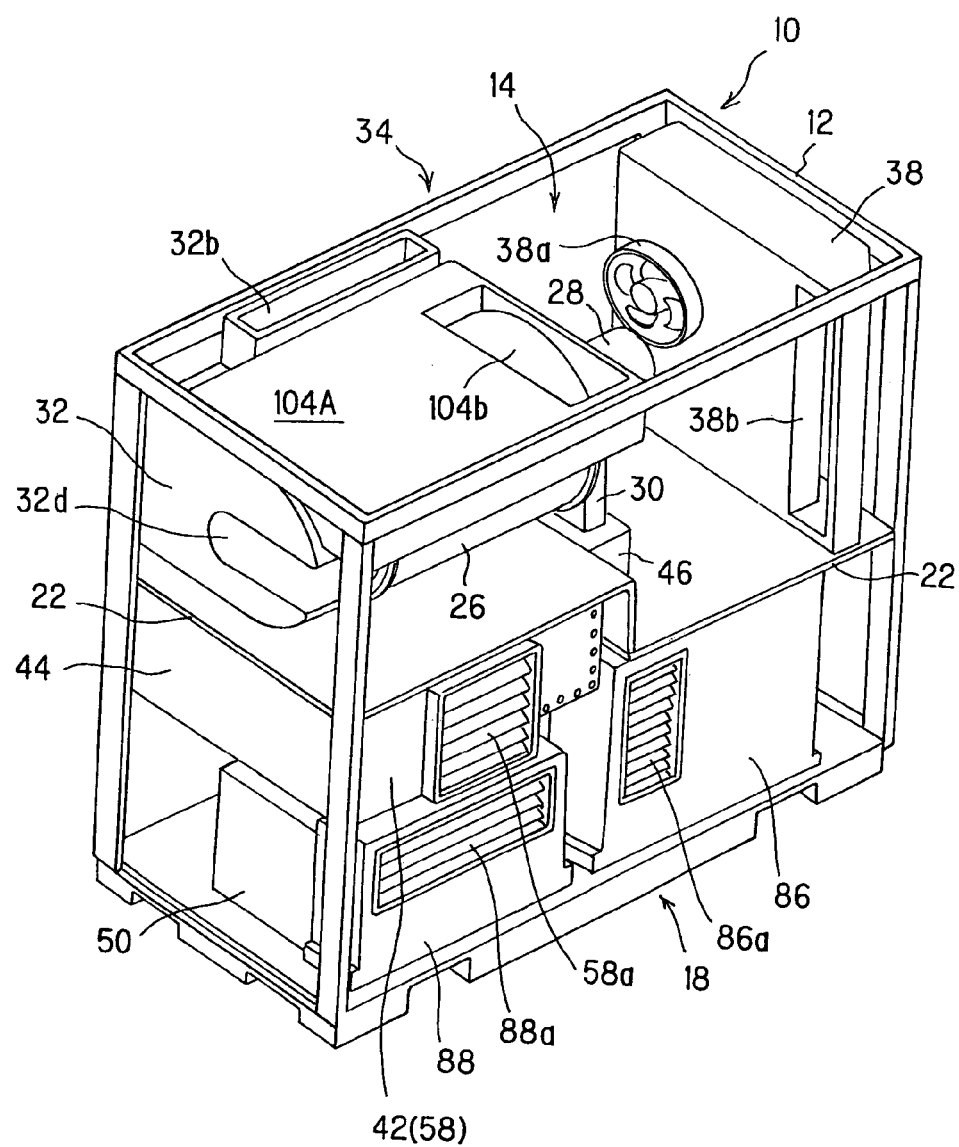
FIG. 11 is a perspective view, similar to FIG. 2, showing the system illustrated in FIG. 1.

As shown in FIG. 11, a compressor air intake duct 86 is mounted in front of (on the second openable maintenance face 18 side of) the fuel compressor 52. The fuel compressor 52 is supplied with cooling air through the compressor air intake duct 86 by operating the compressor fan 52a. (Neither the fuel compressor 52 nor the compressor fan 52a can be seen in FIG. 11 because they are located behind the compressor air intake duct 86.)

Figure 12:
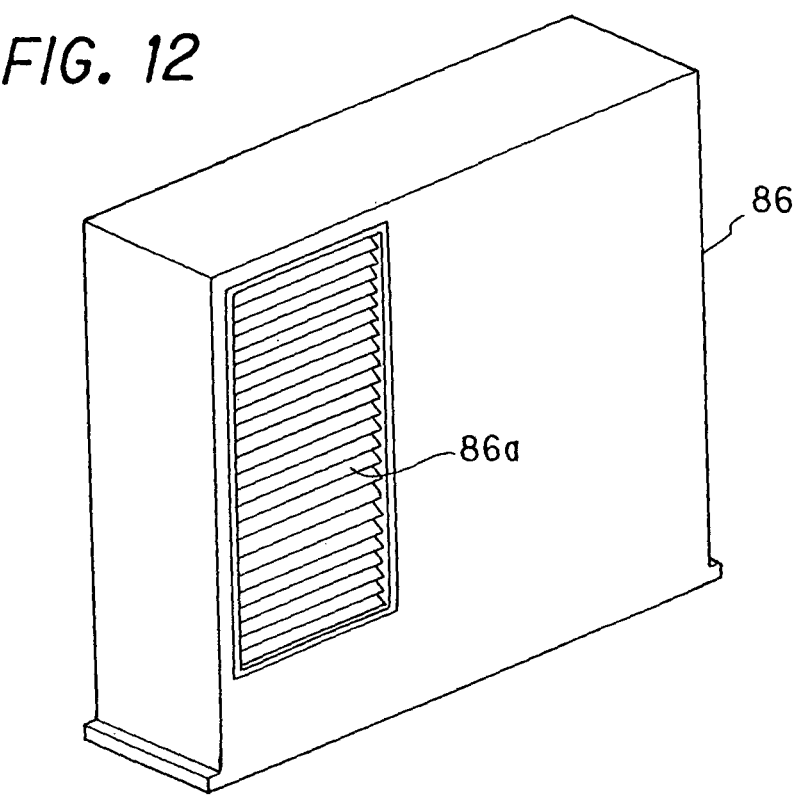
FIG. 12 is an enlarged perspective view of a compressor air intake duct of the system illustrated in FIG. 11, seen at an angle from the front.
Figure 13:
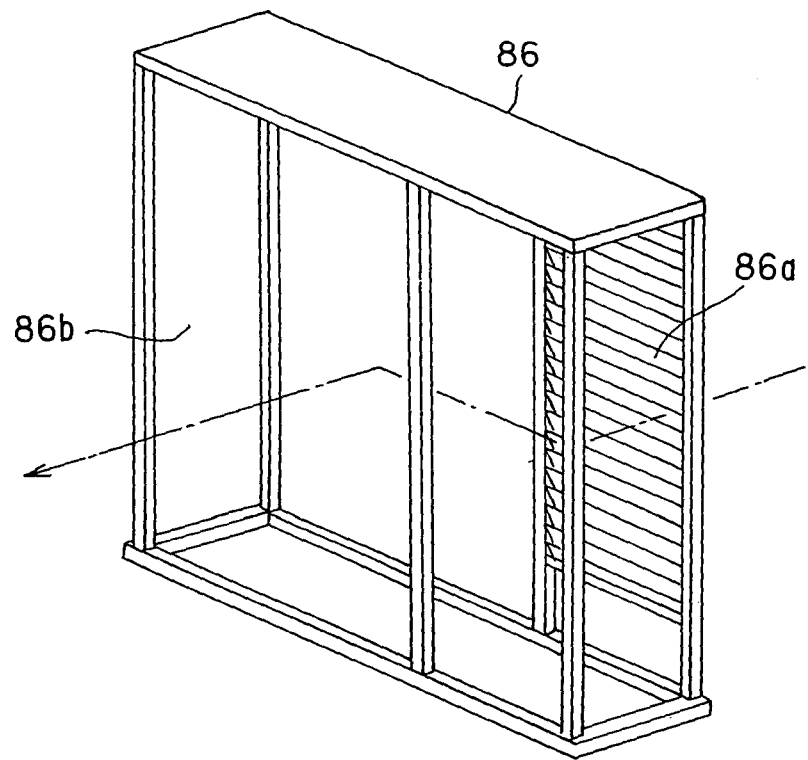
FIG. 13 is an enlarged perspective view of the compressor air intake duct with side wall panels removed, seen at an angle from the rear.

The compressor air intake duct 86 will be explained. FIG. 12 is an enlarged perspective view of the compressor air intake duct 86 seen at an angle from the front. FIG. 13 is an enlarged perspective view of the compressor air intake duct 86 with side wall panels removed, seen at an angle from the rear.

As shown in these drawings, the compressor air intake duct 86 has a box-like shape and is formed with an air inlet 86a on the left side as viewed from the front (right side as viewed from the rear). Intake air flowing in through the air inlet 86a is twice changed 90 degrees in flow direction and then flows out through an exhaust outlet 86b formed on the right side as viewed from the front (left side as viewed from the rear). The exhaust outlet 86b is connected to the compressor fan 52a.

The provision of the compressor air intake duct 86 in this manner prevents the fuel compressor 52 from reaching a high temperature. Moreover, since the compressor air intake duct 86 is given a bent structure that changes the flow direction of the air (cooling air) at least once (twice in this embodiment), the cooling air intake noise of the fuel compressor 52 is lowered to reduce the noise of the generator system 10.

The explanation of FIG. 11 will be resumed. An electrical unit air intake duct 88 is installed in front of the electrical unit 50. The electrical unit 50 is supplied with cooling air through the electrical unit air intake duct 88 by operating the electrical unit fans 50a (not shown in FIG. 11). Although omitted in the drawings, the structure of the electrical unit air intake duct 88 is similar to that of the compressor air intake duct 86. Specifically, the electrical unit air intake duct 88 has a box-like shape and is formed with an air inlet 88a on the top side. Intake air flowing in through the air inlet 88a is twice changed 90 degrees in flow direction and then flows out through an exhaust outlet 88b (not shown) formed on the bottom side. The exhaust outlet of the electrical unit air intake duct 88 is connected to the electrical unit fans 50a.

The provision of the electrical unit air intake duct 88 in this manner prevents the electrical unit 50 from reaching a high temperature. Moreover, since the electrical unit air intake duct 88 is given a bent structure that changes the flow direction of the air (cooling air) at least once (twice in this embodiment), the cooling air intake noise of the electrical unit 50 is lowered to further reduce the noise of the generator system 10.

Figure 14:
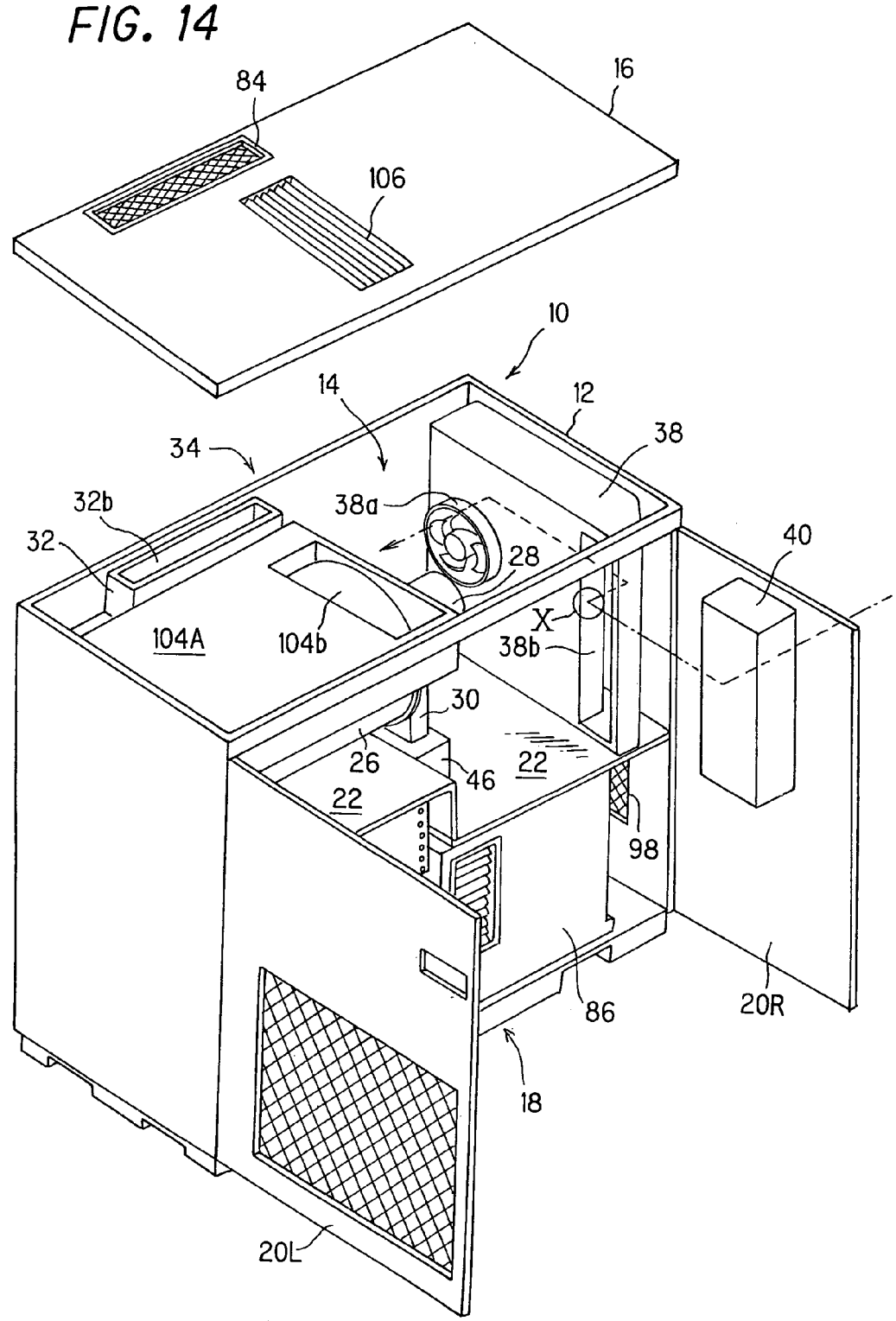
FIG. 14 is perspective view of the housing of the system illustrated in FIG. 11, including the side wall panels.
Figure 15:
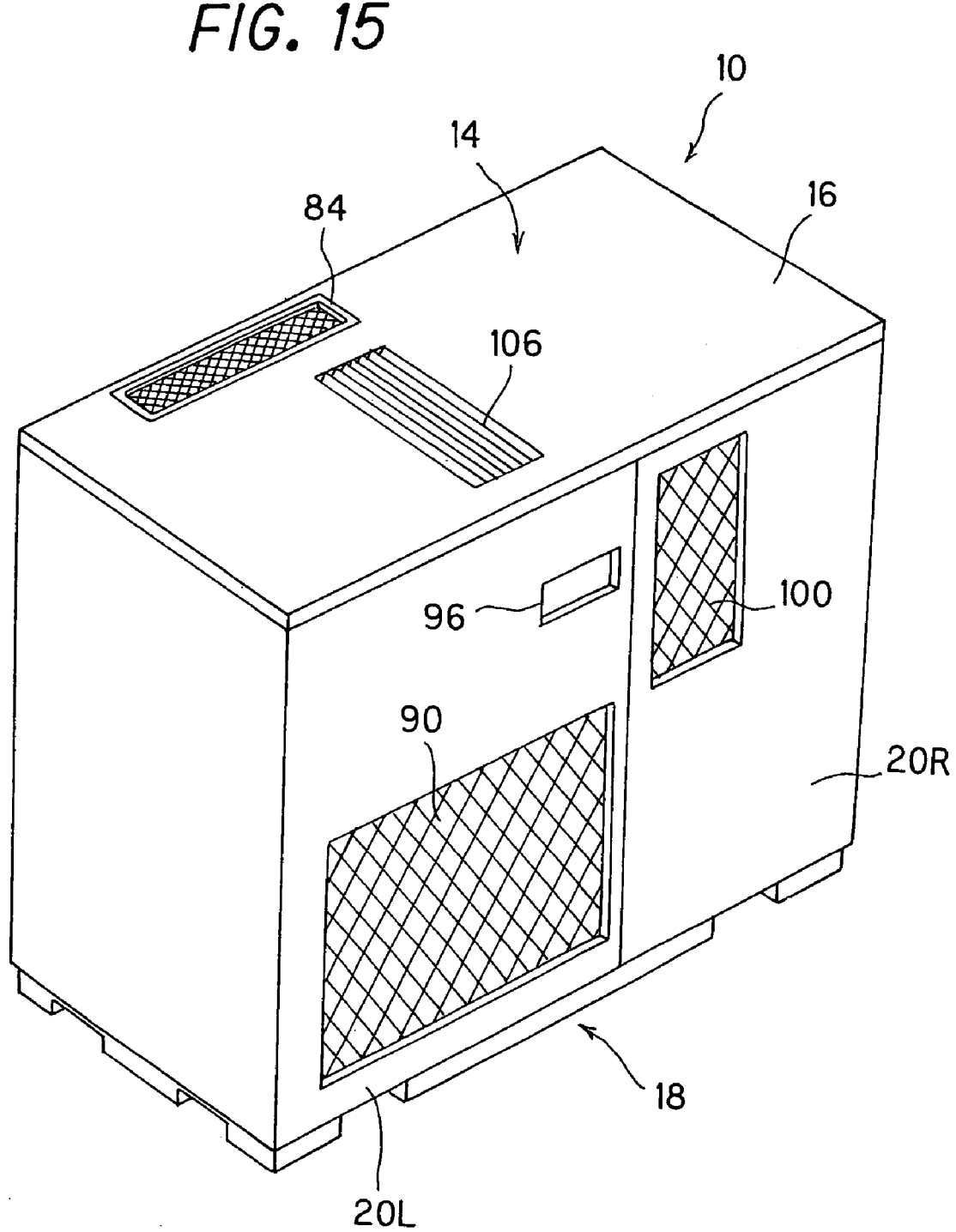
FIG. 15 is a perspective view showing the housing, illustrated in FIG. 14, with the first and second openable maintenance faces closed.

FIG. 14 is perspective view of the housing 12 including the side wall panels. FIG. 15 is a perspective view showing the housing 12 like that of first openable maintenance face 14 but with the first and second openable maintenance faces 14 and 18 closed. FIG. 15 shows the fully assembled (finished) generator system 10. FIG. 14 shows the finished generator system 10 with the openable maintenance faces closed. (The generator system 10 of FIG. 1 is, for convenience of explanation, shown in a not fully assembled state, i.e., with intake and exhaust ducts removed.

As shown in FIGS. 14 and 15, the lower half of the left door 20L is formed with a vent 90 at a location opposite the air inlet 86a of the compressor air intake duct 86, the air inlet 88a of the electrical unit air intake duct 88, and the air inlet 58a of the air intake duct 42 (duct section 58). The upper half of the left door 20L is provided with an operation panel 96. The operation panel 96 is equipped with a display device (not shown) for displaying the temperature at various points in the housing 12, the speed of the engine 26, the generated power output and the like. It is also provided with operation switches (not shown) for starting and stopping the engine 26 and other operations.

Cooling air sucked into the lower bay through the vent 90, compressor air intake duct 86, and electrical unit air intake duct 88 is discharged to the outside of the housing 12 through a lower bay ventilation exhaust outlet 98 provided at an appropriate side face (see FIGS. 1 and 14). The lower bay ventilation exhaust outlet 98 can, if desired, be provided on the side of the second openable maintenance face 18 or on some other side. Preferably, however, it is provided on a side other than that of the second openable maintenance face 18 to ensure that hot exhaust gas is not blown directly onto a worker during maintenance work. Formation of the vent 90 on a different side is also advantageous in the point of preventing hot exhaust gas from being sucked back into generator system 10.

As shown in FIG. 15, the right door 20R is formed with an upper bay ventilation vent 100 at a location corresponding to the upper bay air intake duct section 40. As shown FIG. 14, intake air sucked in by the upper bay ventilation air fan 38a and flowing in through the upper bay ventilation vent 100 changes 90 degrees in flow direction in the box-like upper bay air intake duct section 40 and then flows into the upper bay air intake duct 38 through the opening 38b. The air flowing into the upper bay air intake duct 38 twice changes 90 degrees in flow direction and then flows into the housing 12 through the upper bay ventilation air fan 38a.

The upper bay air intake duct 38 and upper bay air intake duct section 40 are thus given a bent structure that changes the flow direction of the intake air therein at least once (once in the upper bay air intake duct section 40 and twice in the upper bay air intake duct 38 in this embodiment) so that the noise caused by sucking air into the upper bay is lowered to further reduce the noise of the generator system 10.

In FIG. 14, the arrows appear to indicate that the direction of the intake air flow changes four times but this is because the right door 20R is open in FIG. 14. When the right door 20R is closed as shown in FIG. 15, the flow direction change indicated by the reference symbol X because the upper bay air intake duct 38 and the upper bay air intake duct section 40 become airtightly interconnected.

The intake air flowing into the upper bay as shown in FIG. 14 flows into an upper bay ventilation exhaust duct 104 mounted above the engine 26.

Figure 16:
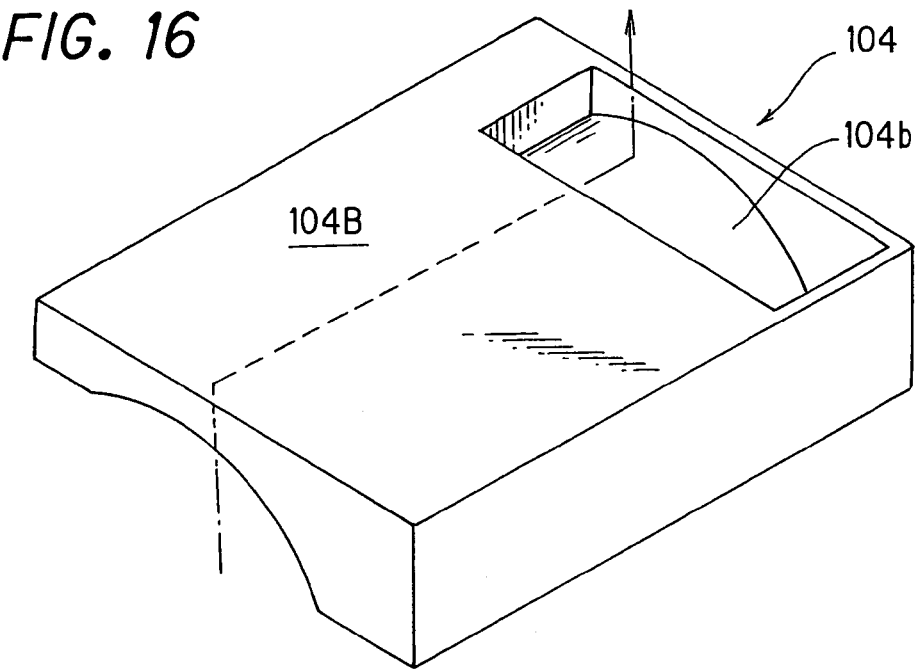
FIG. 16 is an enlarged perspective view of an upper bay ventilation exhaust duct of the system illustrated in FIG. 11, taken in a downwardly slanting direction.
Figure 17:
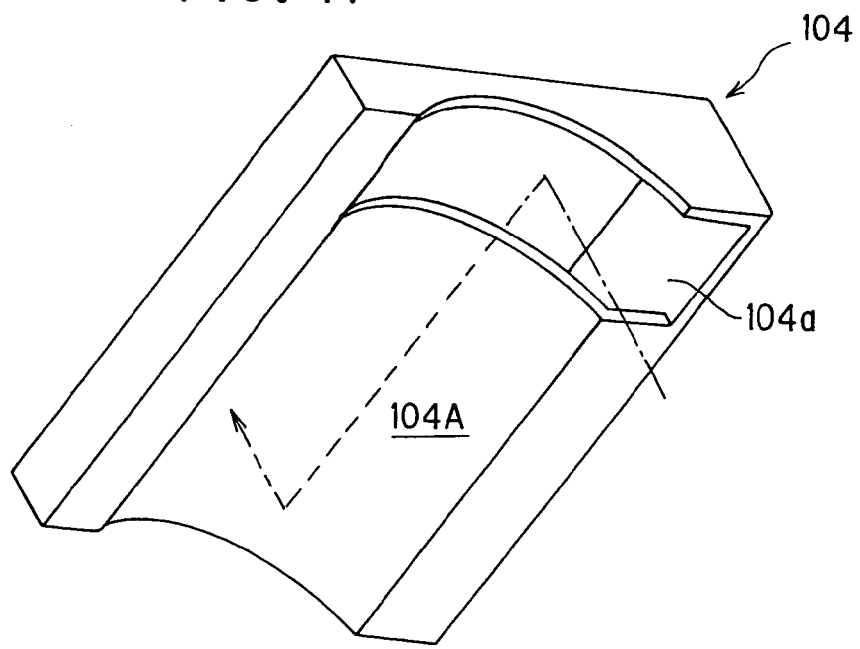
FIG. 17 is an enlarged perspective view of the upper bay ventilation exhaust duct taken in an upwardly slanting direction.
Figure 18:
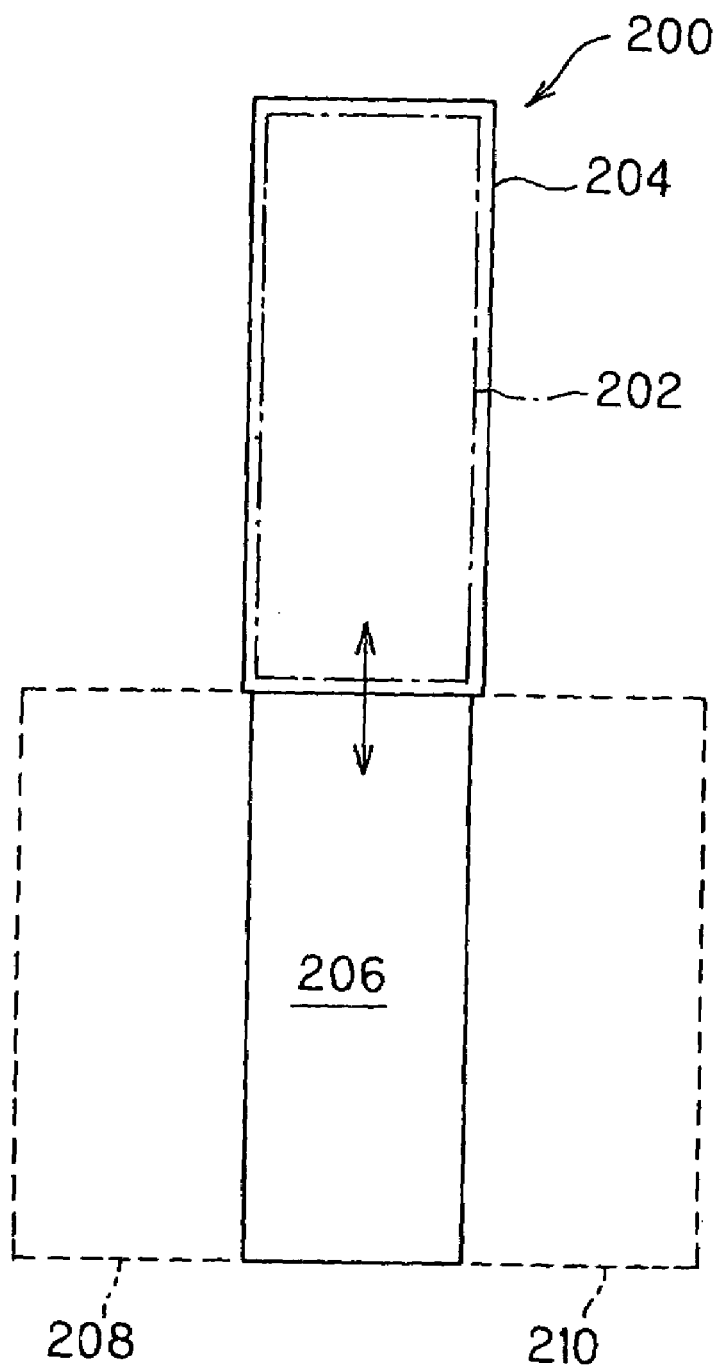
FIG. 18 is a simplified top view of a prior art gas turbine power generation system and showing a horizontal maintenance work space required for the power generation system.

The upper bay ventilation exhaust duct 104 will be explained. FIG. 16 is an enlarged perspective view of the upper bay ventilation exhaust duct 104 taken in a downwardly slanting direction. FIG. 17 is an enlarged perspective view of the upper bay ventilation exhaust duct 104 taken in an upwardly slanting direction.

As shown in FIG. 17, the lower surface 104A of the upper bay ventilation exhaust duct 104 has an arcuate shape complementary to the shape of the engine 26 and is formed with an air inlet 104a. As shown in FIG. 16, the upper surface 104B of the upper bay ventilation exhaust duct is provided with an exhaust outlet 104b at a location diagonally opposite the air inlet 104a. Intake air flowing into the upper bay ventilation exhaust duct 104 through the air inlet 104a therefore twice changes 90 degrees in flow direction therein and then flows to the outside through the exhaust outlet 104b and an upper bay ventilation exhaust vent 106 formed in the roof 16 (see FIGS. 1, 14 and 15).

The upper bay ventilation exhaust vent 106 is thus given a bent structure that changes the flow direction of the intake air therein at least once (twice in this embodiment) so that the noise caused by discharging air out of the upper bay is lowered to further reduce the noise of the generator system 10.

As is clear from FIG. 11, for example, the air inlet 104a of the upper bay ventilation exhaust duct 104 is installed at a location on the far side of the engine 26 as viewed from the upper bay air intake duct 38. As a result, intake air flowing into the upper bay through the upper bay air intake duct 38 passes along the side of the engine 26 and then flows into the upper bay ventilation exhaust duct 104. Further, the intake air flowing into the upper bay ventilation exhaust duct 104 flows therein, i.e., passes over the top of the engine 26, to be discharged from the exhaust outlet 104b. The cooling effect of upper bay ventilation on the engine 26 is therefore enhanced. In addition, the provision of the lower surface 104A of the upper bay ventilation exhaust duct 104 with an acuate shape complementary to the shape of the engine 26 enables effective utilization of the space above the engine 26 and, as such, helps to achieve a compact configuration by minimizing the height of the generator system 10.

A brief explanation will now be given regarding maintenance of the constituents described in the foregoing.

The air intake duct 42 installed in the lower bay of the housing 12 can be removed through the second openable maintenance face 18. The compressor air intake duct 86 and electrical unit air intake duct 88 installed in the lower bay can also be removed through the second openable maintenance face 18. The relatively heavy electrical unit 50 and fuel compressor 52 can be drawn out through second openable maintenance face 18 by sliding them along associated guide rails. The ignition plug 78 of the engine 26 can be removed through the second openable maintenance face 18 after being extracted via the tube 32c and cutaway portion 32d formed in the exhaust duct 32.

The upper bay ventilation exhaust duct 104 installed in the upper bay can be removed through the first openable maintenance face 14. After the upper bay ventilation exhaust duct 104 has been removed, the engine 26 can be removed to the outside of the housing 12 through the first openable maintenance face 14 by using a crane or the like (not shown) to hoist the engine 26 by the frame to which it is fastened (not shown). The engine side air intake passage 30 and generator 28 can be removed together with the engine 26.

Thus, the configuration enables the air filter, ignition plug and other constituents that require relatively frequent maintenance to be given maintenance through the second openable maintenance face 18 formed on the side that offers the best maintenance ease. Some of the maintenance tasks related to the engine 26, such as replacement of the turbine 64, require the engine 26 to be removed from housing 12. In view of this, and the fact that the maintenance cycle in such cases is longer than that of air filter and ignition plug replacement and that it is convenient to use a crane for removing and reinstalling the heavy engine 26, a configuration is adopted that allows such maintenance work to be performed through the first openable maintenance face 14. This enables reduction of installation (dedicated) space and improvement of maintenance ease at the same time.

Although omitted in the drawings, numerous pumps and pipes for cooling and lubricating the engine 26 are present inside the housing 12. All of these are installed at locations near the second openable maintenance face 18. Maintenance work can therefore be carried out easily through the second openable maintenance face 18.

As explained in the foregoing, in this embodiment of the generator system 10, the interior of the housing 12 is divided into upper and lower bays by the partition 22 and the various constituents are optimally assigned for mounting in one or the other of these bays so as to simultaneously respond to the need for improved maintenance ease, lower noise and reduced installation (dedicated) space while ensuring an optimum balance among these conflicting factors. Moreover, low noise is achieved by configuring the intake and exhaust ducts as bent structures.

Although the foregoing explanation is related to a single-spool gas turbine engine, the invention can also be applied to a multi-spool gas turbine engine having two or more axes.

The detachable roof 16 can be replaced by one attached by hinges.

The housing 12 need not necessarily be box-like as described in the foregoing but can take any of various forms such as cubic or regular parallelepipedal, or any of such shapes with rounded edges and/or corners or with a sloped top surface.

The embodiment is thus configured to have a gas turbine power generation system 10, comprising: a single-spool gas turbine engine 26 having a turbine 64 and a compressor 66 coaxially connected to the turbine, an air intake duct 42 that supplies intake air to the engine; a generator 28 connected to a rotating shaft 64a of the engine 26, a housing 12 that houses the engine 26 the air intake duct 42 and the generator 28 and is formed to be a box-like shape having at least two openable maintenance faces 14, 18; and a partition 22 that divides interior space of the housing into two regions in vertical direction into an upper bay and a lower bay such that the engine 26 is installed in the upper bay and the air intake duct 42 is installed in the lower bay at a location directly under the engine. With this, maintenance ease is enhanced by forming the housing to have a box-like shape and defining openable and closable maintenance faces at at least two of its faces. Installation space is reduced and a compact configuration achieved by providing a partition that divides the interior space of the housing into two regions in the vertical direction, namely into an upper bay and a lower bay, mounting the engine in the upper bay and mounting air intake duct for introducing intake air to the engine in the lower bay at a location directly under the engine. Noise is reduced by using a partition to define two separate spaces (bays) and mounting the engine and the air intake duct in the upper and lower bays. Noise is also reduced by preventing engine rotation noise from escaping to the outside through the air intake duct.

Thus, the needs for improved maintenance ease, lower noise and reduced installation (dedicated) space are simultaneously met while maintaining an optimum balance among these conflicting factors. As a side benefit, the fact that the hot engine and the air intake duct are mounted on opposite sides of the partition helps to prevent intake air temperature increase by curbing conduction of engine heat to the air intake duct.

In the system, the two openable maintenance faces 14, 18 of the housing are a top face and a face that lies parallel to the rotating shaft 64a of the engine 26. Thus, the maintenance openings of the housing are defined at the top face and one of the two faces lying parallel to the engine rotating shaft, i.e., openable and closable maintenance faces are defined at two faces. A further improvement in maintenance ease is therefore realized in addition to the effects explained regarding the first aspect. Dedicated space is further reduced because the fact that one of the faces is the top face means that the only openable and closable maintenance face for which space in the horizontal direction must be reserved is that at one or the other of the faces lying parallel to the engine rotating shaft. Maintenance ease is further improved by defining the openable and closable maintenance face at a face lying parallel to the rotating shaft, because this enables a large opening to be obtained owing to the fact that the engine is long in the rotating shaft direction.

The system further includes an exhaust duct 32 that exhausts combustion gas discharged from the engine 26 to outside of the housing 12, and the exhaust duct 32 is installed in the upper bay of the housing at a location near a face 34 that is opposite, relative to the engine, to the face (corresponding to the face 18) that lies parallel to the rotating shaft of the engine 26. Thus, combustion gas exhaust duct for exhausting combustion gas discharged from the engine to the outside of the housing is mounted in the upper bay of the housing at a location near the face on the far side of the engine as viewed from the openable and closable maintenance face. A further improvement in maintenance ease is therefore realized in addition to the effects explained regarding the first aspect because maintenance work can be conducted through the maintenance opening without interference from the relatively large-volume combustion gas exhaust duct.

The system further includes an electrical unit 50 that is electrically connected to the generator 28, and the electrical unit 50 is installed in the lower bay of the housing 12 at a location under the air intake duct 42. Thus, the electrical unit electrically connected to a generator is mounted in the lower bay of the housing at a location under the air intake duct. Specifically, the relatively heavy electrical unit is installed under the relatively light air intake duct. Therefore, in addition to the effects explained regarding the first aspect, the systems becomes easy to move because the center of gravity of the overall power generation system assumes a low position that improves the stability of the system when it is lifted for movement. A further improvement in maintenance ease is also realized.

The system further includes a cooler (electrical unit fans) 50a that cools the electrical unit 50 by external air. Thus, a cooler is provided for cooling the electrical unit with outside air. Therefore, in addition to the effects explained regarding the first aspect, the electrical unit is prevented from reaching a high temperature.

The system further includes a fuel supplier (fuel compressor 52) that supplies fuel to the engine 26 and a cooler (compressor fan 52a) that cools the fuel supplier by external air, and the fuel supplier and the cooler are installed in the lower bay of the housing 12. Thus, a fuel suppler for supplying fuel to the engine and a cooler for cooling the fuel supplier with outside air are installed in the lower bay of the housing. Specifically, the fuel supplier and the engine, which is the hottest of the system constituents, are mounted on opposite sides of the partition. The fuel supplier is therefore prevented from reaching a high temperature. Since this reduces the load on the cooler for cooling the fuel supplier, noise produced by the cooler is reduced. Therefore, in addition to the effects explained regarding the first aspect, noise produced by the power generation system is reduced.

In the system, the housing 12 is formed with grooves (insertion grooves) 54 at its bottom face that receive forks or blades of a forklift. Thus, a bottom face of the housing is formed in different directions with multiple insertion grooves for receiving the forks or blades of a forklift so that the system can be lifted by a forklift from any desired one of the different directions. Therefore, in addition to the effects explained regarding the first aspect, the system can be easily moved irrespective of the shape of the installation site and a further improvement in maintenance ease can be realized.

The embodiment is also configured to have a gas turbine power generation system 10, comprising: a single-spool gas turbine engine 26 having a turbine 64 and a compressor 66 coaxially connected to the turbine 64, an air intake duct 42 that supplies intake air to the engine 26; a generator 28 connected to a rotating shaft 64a of the engine 26, and a housing 12 that houses the engine, the air intake duct 42 and the generator 28 and has an openable maintenance face 14 or 18; wherein the air intake duct 42 includes: a duct section 58 that has an air inlet 58a at a plane coincident with that of the openable maintenance face 18; and a filter-housing section 60 that detachably houses an air filter for cleaning the intake air. This configuration achieves a reduction in the amount of dedicated space required by constituting the air intake duct for conducting intake air to the engine of a duct section having an air inlet at a plane coincident with that of the maintenance opening and a filter-housing section for removably housing an air filter for cleaning conducted intake air, thereby enabling a common space to be utilized for that required in front of the maintenance opening and the air inlet. In addition, the work of replacing the air filter is facilitated because the air intake duct is given a split structure to separately establish a duct section having an air inlet and a filter-housing section for removably accommodating an air filter for cleaning conducted intake air.

In the system, the duct section 58 and the filter-housing section 60 are airtightly joined such that the air intake duct 42 can be taken out through the openable maintenance face 18 as a single unit. This further facilitates the work of replacing the air filter because the duct section and the filter-housing section are airtightly joined so that the air intake duct can be taken out through the maintenance opening as a single unit. In addition, the dedicated space required for the system is reduced because no special space is required solely for air filter replacement.

In the system, duct section 58 is formed to be a structure that changes flow direction of the intake air at least once when the intake air flows from the air inlet 58a to the filter-housing section 60. This achieves a reduction in the intake air noise of the air intake duct and thus a reduction in the noise of the system because the duct section is given a so-called bent structure that changes the flow direction of the conducted intake air at least once between the air inlet and the point where it flows into the filter-housing section.

The system further includes: a divider (air intake duct mount 44) that divides interior space of the housing into two regions into an upper bay and a lower bay such that the engine is installed in the upper bay and the air intake duct is installed in the lower bay, and an air intake passage (mount side air intake passage 46) provided in the divider such that the intake air passes through the air filter of the air intake duct to the engine. This achieves an improvement in the ease of removing the air filter and thus a further improvement in the ease of replacing the air filter because it provides a divider for airtightly compartmenting the interior of the housing into a region for installing the air intake duct and a region for installing the engine and adopts a structure whereby intake air passing through the air filter of the air intake duct is supplied to the engine through an air intake passage provided in the divider.

In the system, the air intake passage (mount side air intake passage 46) is formed to be a structure that changes the flow direction of the intake air at least once therein. This achieves an improvement in low noise operation and thus a still lower noise system because the air intake passage is given a so-called bent structure that changes the flow direction of the conducted intake air at least once therein.

The entire disclosure of Japanese Patent Application Nos. 2002-247484 and 2002-247485 both filed on Aug. 27, 2002, including specification, claims, drawings and summary, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A gas turbine power generation system, comprising:
   a single-spool gas turbine engine having a turbine and a compressor coaxially connected to the turbine;
   an air intake duct that supplies intake air to the engine;
   a generator connected to a rotating shaft of the engine;
   a housing that houses the engine, the air intake duct and the generator and is formed to be a box-like shape having at least two openable maintenance faces; and
   a partition that divides an interior space of the housing into two regions in a vertical direction including an upper bay and a lower bay such that the engine is installed in the upper bay and the air intake duct is installed in the lower bay at a location directly under the engine.

2. A system according to claim 1, wherein the two openable maintenance faces of the housing are a top face and a face that lies parallel to the rotating shaft of the engine.

3. A system according to claim 2, further including an exhaust duct that exhausts combustion gas discharged from the engine to outside of the housing, and the exhaust duct is installed in the upper bay of the housing at a location near a face that is opposite, relative to the engine, to the face that lies parallel to the rotating shaft of the engine.

4. A system according to claim 1, further including an electrical unit that is electrically connected to the generator, and the electrical unit is installed in the lower bay of the housing at a location under the air intake duct.

5. A system according to claim 4, further including a cooler that cools the electrical unit by external air.

6. A system according to claim 1, further including a fuel supplier that supplies fuel to the engine and a cooler that cools the fuel supplier by external air, and the fuel supplier and the cooler are installed in the lower bay of the housing.

7. A system according to claim 1, wherein the housing is formed with grooves at its bottom fact that receive forks of a forklift.

8. A gas turbine power generation system, comprising:
   a single-spool gas turbine engine having a turbine and a compressor coaxially connected to the turbine;
   an air intake duct that supplies intake air to the engine;
   a generator connected to a rotating shaft of the engine; and
   a housing that houses the engine, the air intake duct and the generator and has an openable maintenance face;
   wherein the air intake duct includes
   a duct section that has an air inlet at a plane coincident with that of the openable maintenance face,
   a filter-housing section that detachably houses an air filter for cleaning the intake air;

a divider that divides an interior space of the housing into two regions including an upper bay and a lower bay such that the engine is installed in the upper bay and the air intake duct is installed in the lower bay; and an air intake passage provided in the divider such that the intake air passes through the air filter of the air intake duct to the engine.

9. A system according to claim 8, wherein the duct section and the filter-housing section are airtightly joined such that the air intake duct can be taken out through the openable maintenance face as a single unit.

10. A system according to claim 8, wherein the duct section is formed to be a structure that changes flow direction of the intake air at least once when the intake air flows from the air inlet to the filter-housing section.

11. A system according to claim 8, wherein the air intake passage is formed to be a structure that changes flow direction of the intake air at least once therein.

* * * * *